United States Patent [19]

Shadzi et al.

[11] Patent Number: 4,929,499

[45] Date of Patent: May 29, 1990

[54] USE OF NICKEL-PHOSPHOROUS UNDERCOAT FOR PARTICULATE MEDIA IN MAGNETIC STORAGE DEVICES

[75] Inventors: Bahram Shadzi; Christopher A. Weaver, both of Omaha, Nebr.

[73] Assignee: Magnetic Peripherals Inc., Minnetonka, Minn.

[21] Appl. No.: 380,758

[22] Filed: Jul. 17, 1989

Related U.S. Application Data

[62] Division of Ser. No. 183,863, Apr. 20, 1988, abandoned.

[51] Int. Cl.$^5$ ............................................. G11B 5/66
[52] U.S. Cl. ................................. 428/336; 427/129; 427/130; 427/131; 427/132; 428/64; 428/469; 428/652; 428/694; 428/695; 428/704; 428/900; 428/928
[58] Field of Search ............................. 427/127–132, 427/48; 428/64, 694, 704, 336, 461, 457, 695, 900, 928, 469, 652

[56] References Cited

U.S. PATENT DOCUMENTS 4,551,355  11/1985  Ericson et al. ..................... 427/48
4,698,251  10/1987  Fukuda et al. ................. 427/292 X
4,786,564  11/1988  Chen et al. ........................ 428/694

OTHER PUBLICATIONS

Data–Storage Technologies for Advanced Computing, Kryder, Mark H., Scientific American, vol. 257, No. 4, Oct., 1987, pp. 116–125.
Designers Guide to Disk Drives, Eidsmore and Hirshorn, Digital Design, Nov., 1983, pp. 40–63.

Primary Examiner—Bernard Pianalto
Attorney, Agent, or Firm—Edward P. Heller, III

[57] ABSTRACT

An Ni-P (Nickel-Phophorous) undercoating is provided under particulate (spin-coated) magnetic media. Particulate media, largely due to the way it is applied to the disk, is less expensive than thin film media. Described are the systems and methods to utilize the undercoat for particulate media.

4 Claims, 5 Drawing Sheets

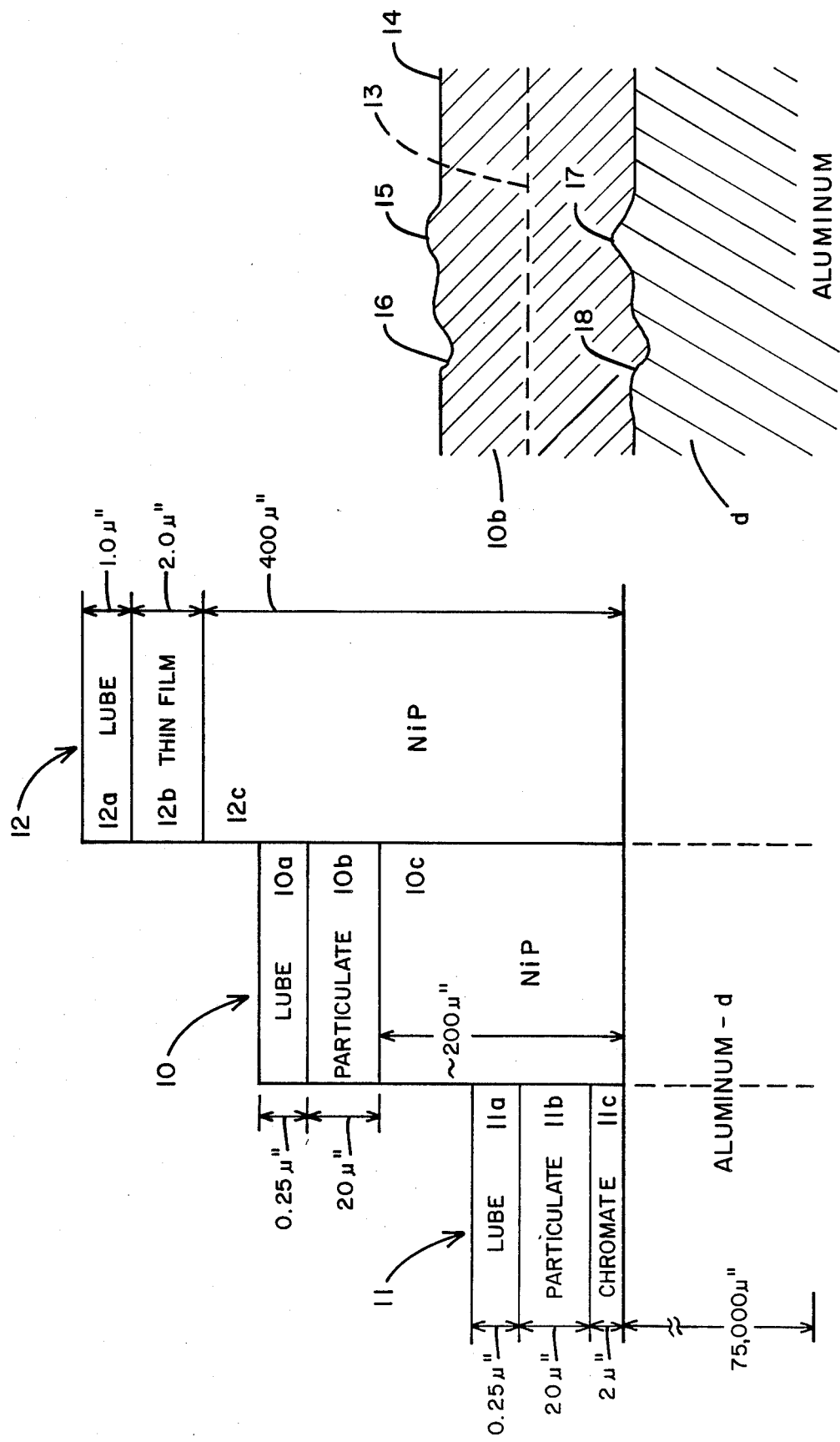

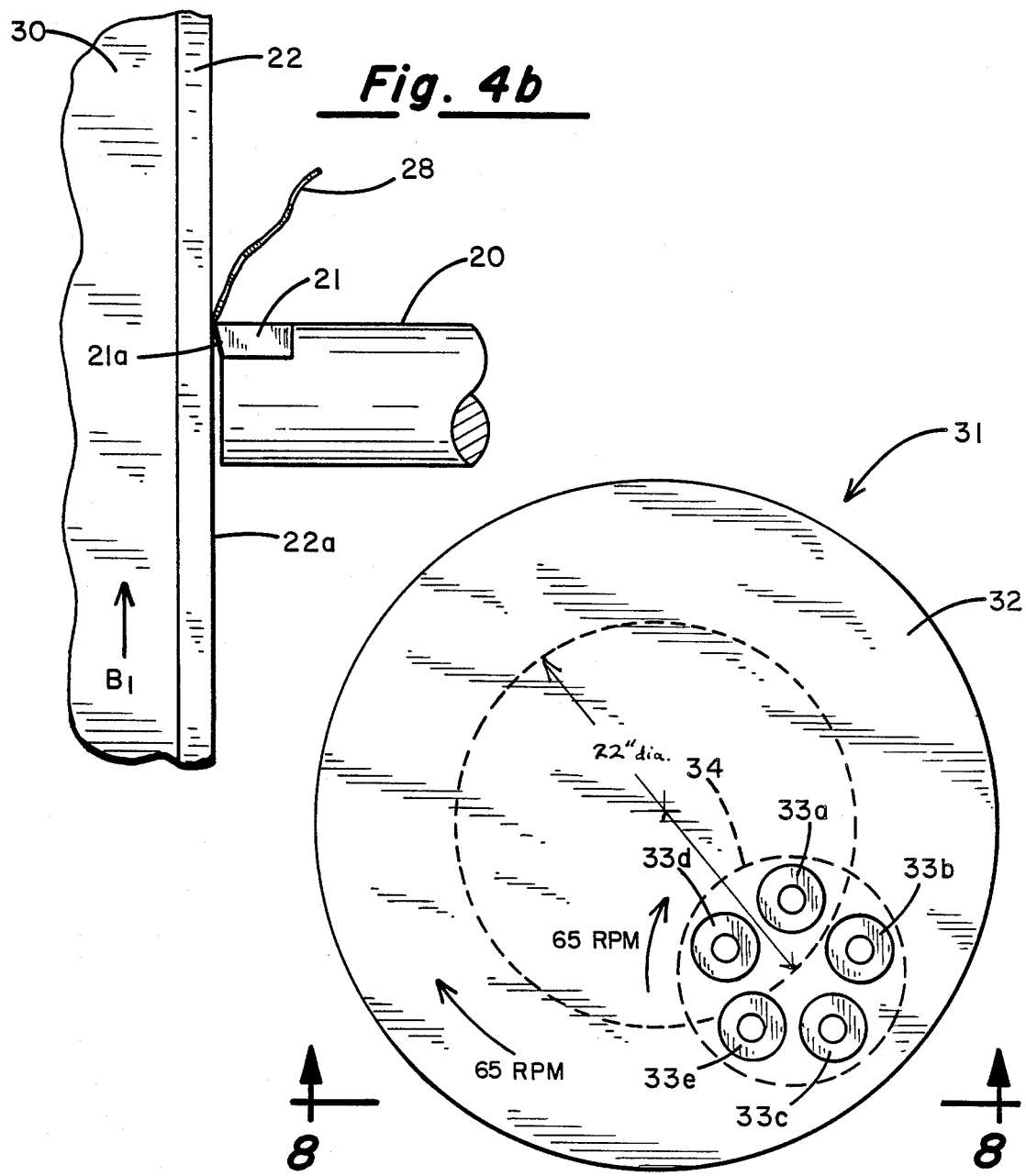
*Fig. 4b*
*Fig. 7*
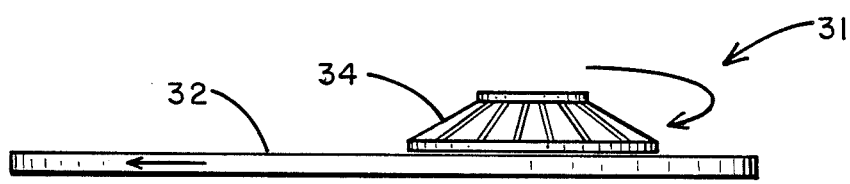
*Fig. 8*

USE OF NICKEL-PHOSPHOROUS UNDERCOAT FOR PARTICULATE MEDIA IN MAGNETIC STORAGE DEVICES

"This is a divisional of copending application Ser. No. 07/183,863 filed on 04/20/88 now abandoned".

This invention relates to the field of coating methods and materials for media for magnetic storage devices.

BACKGROUND

This invention provides a new method for providing an undercoat for "particulate media". Viewed differently, this patent also teaches a new undercoating for particulate media, one which is in one sense similar to the undercoating for "thin-film" media. Particulate technology has been available for about 25 years and is well understood to be a reliable media. It is currently the predominate source of magnetic media which is typically found in computer storage devices.

In magnetic disk drive storage devices, the thinner the magnetic media coating, the smoother it is and the smoother it is, the closer the read/write heads may fly to it. However, where the undercoat (and the substrate) is not smooth, a very thin media coating can not be used since it will not cover the deformities and aberrations from flatness unless the coating is thick enough to fill the valleys and pits and cover the peaks and ridges. At the higher bit-densities required in high density disk drives, the read/write heads need to fly extremely close to the media on the disk in order to read the smaller magnetic bit transitions accurately. (Fly height for these heads is less than 10 microinches or less than 0.25 microns.) With this invention the cheaper particulate media coatings may be uaed to achieve bit-densities herefore only available on thin film media.

Unfortunately it is quite costly to sputter media onto disks (which is the process used to apply the thin film media coating). It requires a high energy magnetic field in a controllable vacuum chamber and uses expensive, carefully produced "targets" or sources of magnetic thin film coating.

Spin coating, on the other hand, is substantially cheaper and produces what is called a particulate media. (because of the particles of magnetic media (usually iron oxide) in the magnetic suspension when in liquid form), but, it produces it as a thin coating, somtimes called a thin film. To avoid confusion, all further reference in this patent to "thin film" refers to coated media and "particulate" refers to spin coated media. An example of spin coating is described in U.S. Pat. No. 4,551,355, issued to Ericson and Shadzi, and incorporated herein by reference.

Thin film media is generally a metal alloy (NiCoCr, for example). Particulate media in its pre-coated form is usually Iron-oxide or Barium-Ferrite or similar particles in a suspension containing a mixture of polymeric binders. When the solvent is evaporated and the polymeric binders react during curing, the magnetic particles get held in a positional orientation by binding matrix. The binding matrix is usually primarily attached by mechanical linkages to the Ni-P undercoat, although probably some chemical bonding is also occurring. The binding polymers may be of various formulations but a one to one ratio of phenolic and phenoxy resins may be used.

It is an important feature of the undercoat that it be non-magnetic For particulate media the traditional undercoating has been a Chromate-Phosphate conversion coating. However, Chromate-Phosphate solution reacts with the impurities in the Aluminum substrate, the end result of which is areas or pits at which the later coatings will either not stick or cause "drop-outs". Drop-outs are areas ot the disk which, when assembled into a disk drive, cannot be written to and read from. Chromate-Phosphate is also relatively expensive.

In this short, Ni-P undercoating for particulate media was unknown prior to this invention the particulars of which are described below.

SUMMARY OF THE INVENTION

Briefly stated, this patent teaches the use of a nickel-phosphorous (Ni-P) undercoat for particulate media, and it teaches a method for creating this undercoat which allows for higher bit-density recording than previously available from particulate media coated disks.

Instead of stone grinding the surface in preparation as is done for thin film media, the aluminum disk substrates are cut by a diamond cutting tool held level against it while the disk is turned at high speed. The shape of the cutting surface is described with reference to the detailed description below. The surface of a diamond turned disk is extremely smooth and will oxidize during or after cutting. To remove these impediments to plating, the substrate is treated with a chemical etch. It is believed that the chemical etch removes any oxides which build up as well as removimg some rough spots and uniformly micro-pits or activates the surface.

A thin layer of zincate coating is then applied by electroless plating, until the surface of the substrate is completely and uniformly covered. In the preferred embodiment, this layer is removed by Nitric Acid and a second zincate layer is redeposited. After the zincate coating, a Ni-P coating is on, also in an electoless solution. However this Ni-P coating for particulate media application is approximately 300 to 350 microinches in thickness, as opposed to the 600 to 650 microinches required for thin film media.

Next the Ni-P coated disk is subjected to polishing, in a manner which produces a more locally random (as opposed to being random over a wider area) polished surface than that polished into thin film media Ni-P undercoatings. The resultant undercoating will have polishing cuts that are shorter and more shallow than those cut into thin film coated disks which are polished differently. This polishing process removes from 100 to 125 microinches from the surface as opposed to removing 200 to 250 microinches from the thin film media surface the way thin film media undercoats would be polished.

The surface must then be textured or patterned using a diamond abrasive paste applied to a polishing pad rotated counter to the direction of rotation of the disk surface being textured so as to leave a circumferential pattern.

At this point the disk is ready for spin coating of particulate media, generally done in a manner as described in the abovereferenced patent issued to Ericson and Shadzi.

BRIEF DESCRIPTION OF THE DRAWINGS

FIG. 1 is a cutaway view of one side of an aluminum subtrate, coated with three different sets of coatings arranged in adjacent stacks.

FIG. 2 is a cutaway view of a small portion of a substrate coated with Ni-P.

FIG. 4b is a close up view of the tip and tool of FIG. 4.

FIG. 7 is a top view of the platen and pad showing mounted disks as used in the polishing machine.

FIG. 8 is a side view of the platen of FIG. 7 with the disk mounting fixture.

DETAILED DESCRIPTION

The finished undercoating referred to herein as Ni-P is a crystalline lattice of Nickel and Phosphorous with, in the preferred embodiment, about 11 to 12 percent phosphorous, and the rest nickel.

It is a non-magnetic alloy. The same Ni-P electroless plating solution one could use for undercoating thin film disks may be used to undercoat the particulate media disks. The difference is that with the process taught in this patent, the undercoating need be only half as thick as that used for thin film undercoating and therefore the process is more efficient with respect to time and chemical solution expended at this step.

The aluminum substrate must be prepared first, before the Ni-P undercoat can be plated down. There are three main steps to this preparation of the raw aluminum substrate disks. First the disks will be turned at high speed under a diamond tool, then chemically etched, then plated with a zincate pre-undercoat layer.

Figure 4A:
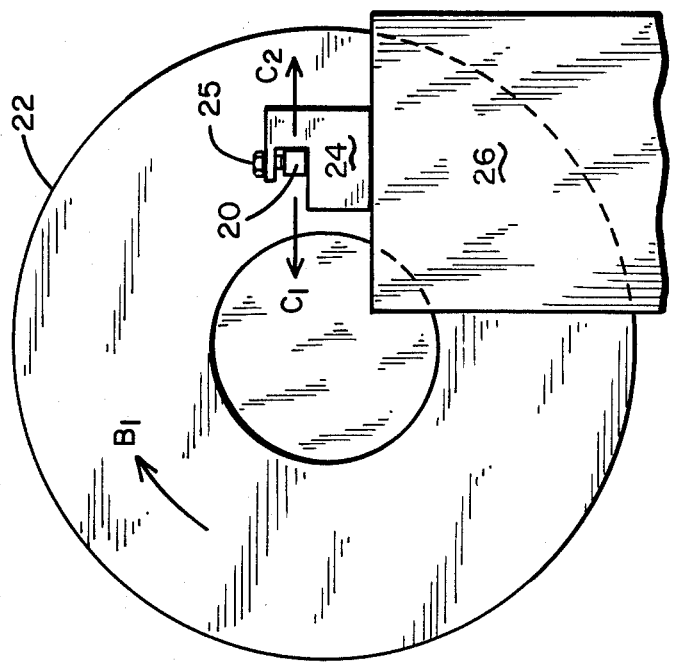
FIG. 4a is a front view of the diamond tool of FIG. 4.
Figure 4:
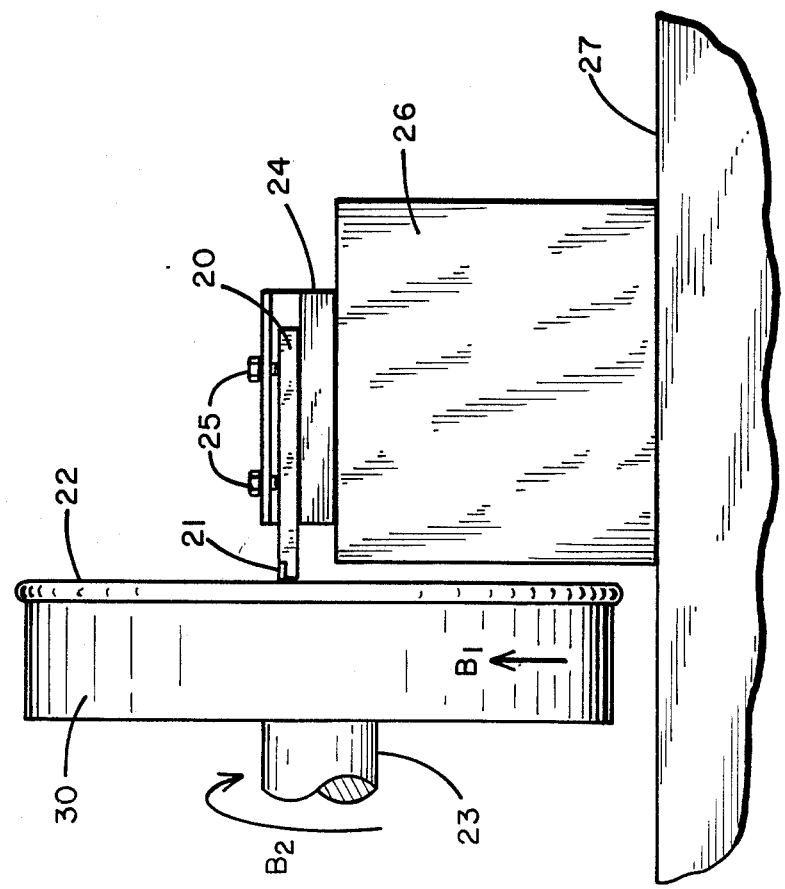
FIG. 4 is a side view drawing of the diamond cutter mounted above a disk for turning as in the preferred embodiment.

Diamond turning:

For the discussion on diamond turning reference should be made to FIG. 4, in which the relevant portions of such an apparatus are referred to with the numeral 15.

(The measurements indicated with reference to this diamond turning process are for purposes of the presently preferred embodiment description and are not meant to be limiting. Those of ordinary skill in the art shall be able to apply these details to the particulars of their related projects by varying them to fit their situations. A cutting edge of titanium-carbide or substrate of similar hardness may be substituted for the diamond but the diamond is presently preferred.)

Diamond turning is accomplished with a tool 20 that holds a faceted diamond 21 over a disk 22. The disk is mounted on a vacuum chuck 30 capable of greater than 3000 rpm when driven by shaft 23. The disk 22 is started spinning in the direction indicated by the arrows arrows B1 and B2 while the diamond 21 is held at a constant distance from the disk surface so as to acheive a given level height. The tool 20 is securely mounted to a fixture 24 by bolts 25, and the fixture and the fixture is mounted to a crossslide 26, which in turn is mounted to a granite bed 27 for stability.

FIG. 4a shows the frontal view of the same structure of FIG. 4, sans the granite bed, looking at the disk 22. ID stands for Internal Diameter and OD for Outer Diameter. The tip of the tool is moved by motion of the cross slide along the arrows C1 and C2, and during the turning or cutting process in direction C2, or ID to OD.

(Other means for applying appropriate weight to the surface, including springs, changed arm structure, etc. are within the ordinary skill of those in the art. Means for providing a crosslide are also well within the skill of those in the art. What is important in crosslide movement is maintaining an exact level height of the cutting edge vis-a-vis the disk, and to a lesser extent moving at constant velocity in the ID to OD direction.) At 3000 rpm the diamond tool is moved radially outward in the direction indicated by arrow C2 over the disk at a constant velocity of approximately 3.0 inches per minute. The disk linear velocity during the diamond turning is about 7100 feet per minute. There are acceptable ranges for these speeds, but the approximate numbers given are presently preferred.

The tool itself can be more clearly seen with reference to FIG. 4b, where the tool is again numbered 20 and the tip 21. The tip in the preferred embodiment is an industrial grade diamond with a ground surface 21a held at an angle roughly 7 degrees from the disk surface 22a. As explained in the summary the tip could be another material. The discarded aluminum substrate material 28 cutaway from the surface 22a is also shown. This diamond turning process produces a very smooth surface from the rough aluminum surface.

The tool 20 may be constructed of any hard material strong enough to support the stresses encountered by the diamond scrapping the aluminum surface, and of holding the diamond or cutting tip in place throughout the process.

In preparing the thin film media disk substrates to receive their Ni-P undercoat, by contrast, the common method is to grind the surface flat with flat stones that act as an abrasive in a grinding machine. The lathe process used in this invention and described above produces a much smoother surface than that used under thin film media, and produced by grinding. It is too smooth even to take the Ni-P plating well, and thus prepartion steps of cleaning, etching, and zincate plating (or their equivalents) are needed. Thin film media requires etching and plating too but it uses a different degree of etch by treatment in several different acid baths before zincate plating prior to nickel-phosphorous plating.

Preparation for Ni-P plating:

Another problem which occurs is that the aluminum will oxidize after turning and being freahly exposed to air. This oxidation process must be stopped and reversed or the Ni-P in the thin coating used for particulate media by this invention will not properly nucleate at the oxidized locations.

The cutting or turning process usually involes a cutting oil or other coolant. To remove this cutting oil, a degreasing step, followed by an alkaline cleaner (soap) and rinsing with deionized water is used prior to Ni-P plating.

An antioxidant chemical etch developed to solve the smoothness and oxidation problems. The diamond turned disks are held in this chemical for roughly one minute and then rinsed with deionized water. The etch is made up of 3% by volume of a mix of roughly equal parts pf phosphoric, nitric and chromic acid, the rest being made up of deionized water. The etch is used at ambient temperature and causes micro etching of the surface.

After the disk subtrate has been turned and microetched, it is plated by dipping it into a zincate solution for long enough to uniformly cover the entire surface with a zincate coating. At a concentration similar to that used for thin film plating, The electroless plating takes about four minutes.

It is probable that Cadmium or Mercury hydroxide solutions could be used instead of Zinc, if desired.

Figure 3:
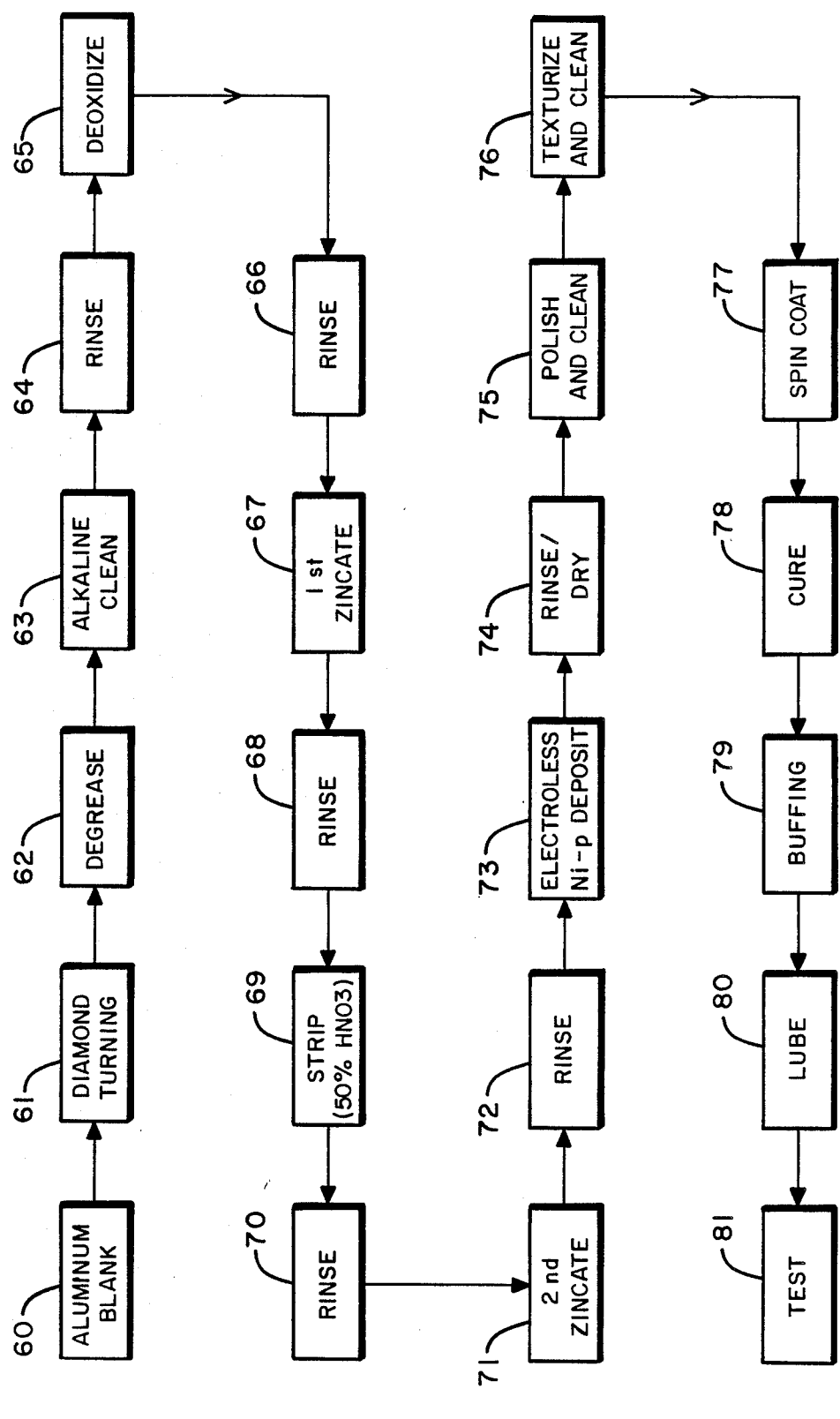
FIG. 3 is a flow diagram showing the steps used in the inventive process.

In the preferred embodiment, a strong (50% preferred) nitric acid bath is then used to remove the first zincate layer and is then rinsed away and a second zincate ploaring redeposited. This assures a good surface for the next, Ni-P plating process. Of course, it should probably be mentioned that the disks are rinsed with deionized water between each step. Refer to FIG. 3, which is discussed more fully below for details.

Ni-P plating:

The Ni-P plating process is unremarkable. The same solution which is used for thin film sputtered media may be employed here, at a concentration which yeilds about a 3-4 microinches of Ni-P growth per minute in solution. The process is an exchange process where the Ni-P replaces the Zn to bond the aluminum. The difference here is that for the particulate media undercoat 300 to 350 microinches need be laid down while typically 600 to 650 microinches are laid down in the thin film undercoat process.

Thus, with reference to FIG. 2, the Ni-P layer 10b is plated over the aluminum layer d. This layer of Ni-P is not smooth enough to use for undercoating media since it will carry on its surface any imperfections from the substrate, such as 17 and 18 at the surface as imperfections in the Ni-P layer, 15 and 16. Thus to smooth the surface, the Ni-P layer is polished down. Because of the relative smoothness of the substrate which has been subjected to diamond turning instead of grinding, and also because of the thinness of the Ni-P coating, the imperfections in the Ni-P film structure will be smaller and thus less surface will have to be removed (so lower thickness of the Ni-P is required).

Polishing the Ni-P layer:

For the thinner Ni-P layer used in this invention a single sided polisher has been adapted from the silicon wafer industry. Any polishing mechanism which could meet the functionality described herein could work, and still be within the scope of this invention.

The particular machine adapted was a Siltec machine, manufactured by Siltec Co. of Menlo Park, California. Referring first to FIGS. 7 and 8, the essential parts of the polisher are shown and referred to with the numeral 31. The machine has a 36" pancake platen 32 which is rotated at 64 rpm. On this platen goes a pad of porometric polypropylene having a nap of 20 to 22 thousandths of an inch., under which is a compressible and porous base of the same material. The pad on the platen is covered with an aluminum oxide, water based slurry, having particles of 0.3 to 0.5 microinches suspended in it. The pad used in the preferred embodiment is called "Politex Supreme" by its maker, Rodel Products Corporation of Scottsdale, Arizona, and the slurry is called DP3 by Union Carbide Corporation. The pad is not shown on the platen, but a copy of the descriptive explanation of Politex Supreme is included as the appendix hereto.

The Siltec machine has four carriers, each round and centered at the 22 inch diameter from the center of the platen 32. Only one carrier 34 is shown. The other three are each centered over equally spaced quadrants of the platen surface. In one embodiment (shown) each carrier 34 (only one shown) has five Ni-P plated disks in a template within the carrier that exactly fits the disks within a few thousanths of an inch, slip-fit tolerance. Another embodiment has only one, larger disk centered in the carrier by a different template. In the preferred embodiments in the case of however many disks are in a template, a pad of the same material that is on the platen, but without a nap, is adhered to the flat metal upper surface of the template by stiction, through the expedient of a small quantity of water applied to the pad. An unpolished disk, say, disk 33a, is then placed onto the holding pad behind the template with pressure and it will hold well enough to be suspended above the pad on the platen 32 until the other disks 33b—e are in place and ready to be pressed into the platen by the polisher.

The carrier 34 rotates in the direction indicated by arrow C, while the platen is rotated in direction indicated by arrow D, both at the same speed in revolutions per minute. This imparts a movement in opposite diections for an equal amount of time when measured at any point on the surface of one of the disks 33a-e, where the entire carrier undersurface is on the pad on the platen.

To accommodate possible variances in the rotational axes of the carriers and the platen, at least each two carriers or all the carriers should be pressed into the platen, not by individual pistons, but in a fulcrum arrangement, with some gimbal or joint to allow the carrier under surface to follow the platen well. The pressure applied in the preferred embodiment is anywhere between 140 lbs. to 378 lbs.

This polishing process can be contrasted with that used in the thin film Ni-P polishing process, where, if the same machine were used, the Rodel 750 pad may be used, with several stages of abrasive particles, starting at around 0.8 microinches and ending with a 0.3 microinch particle polishing slurry. Each time with the thin film preperation the particles are in an aluminum nitrate and water, whereas the particulate undercoat may use a less acid diluant.

The most obvious difference is the amount of material which must be removed, there being about 100–125 microinches removed for the particulate undercoat and about 200 to 250 removed for the thin film undercoat.

Figure 6:
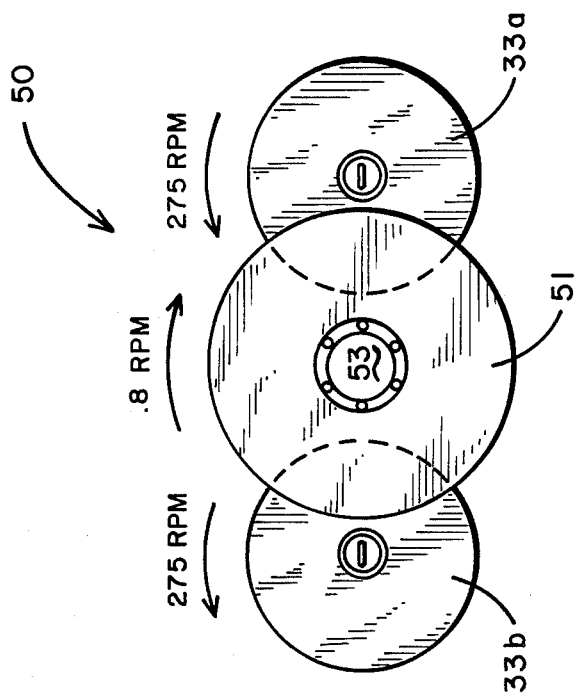
FIG. 6 is a side view of the relevant parts of the machine of FIG. 5.
Figure 5:
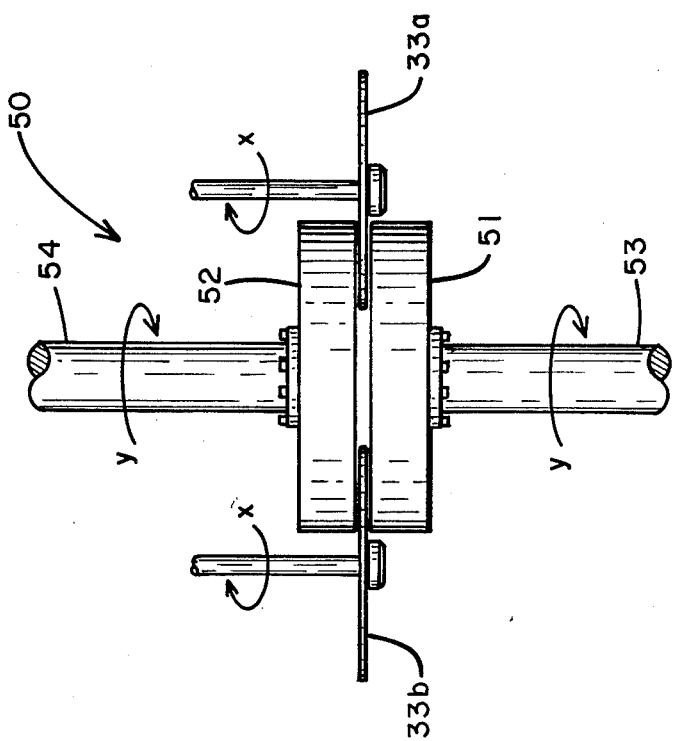
FIG. 5 is a top view of the texturing machine, showing disks mounted thereon.

Thef texturizing process:

Texturizing is the final preparation process before spin coating the disks with particulate media. The idea is to develop a circumferential pattern of ridges and valleys for the media particles, which are alongated in shape, to lay down in. For this process, a circumferential polisher described with reference to FIGS. 5 and 6 is used. With reference to FIGS. 5 and 6, the machine is referred to with numeral 50. The machine utilizes opposing polishing pads mounted on disks 51 and 52, (which, in turn, are mounted on shafts 53 and 54). The pad pressure may be about 10 to 15 psi on the disk surface. The pads meet the surface of disks 33a and 33b, which are rotated in an opposing direction, arrow X, from that of the polishing pads, arrow Y. The disks are rotated at about 275 rpm and the pads at 0.8 rpm which creates a circumferential pattern (concentric rings) on both sides of the disks. Diamond abrasive is loaded into the cutting pads which lock the diamond chips or slivers into the weave of the fabric. Cutting oil is sprayed on the disks to aid in cutting lubricity and acts as a coolant during texturing. Overall texturing requires about three minutes, and surface finishes range from 0.4 to 0.8 microinches.

In contrast, texturing the Ni-P undercoat for thin film media is done completely differently. It uses a tape abrasive in lengths of 150 to 200 meters, using about 10 to 20 inches of two such strips for each disk. The abrasive (aluminum oxide) tapes are held against the surface of the disk and the disk is spun at about 150 to 200 rpm between the moving tapes. Cycle time is about one minute per disk. The final surface finish is 0.09 to 0.12 microinches RA, measured radially. The process described above for particulate media is smoother and provides a better fluid flow for the spin coating process.

The process 59 of disk preparation described in this patent can be summed up by reference to the flow diagram of FIG. 3. The Aluminum blank 60 is first diamond turned 61, then, in the preferred embodiment, degreased 62 and alkaline cleaned 63 and again rinsed 64 before the deoxidizer is used in step 65. The etchant is rinsed 66 and the blank is then subject to the zincating steps 67 through 71, in the preferred embodiment or just steps 67 and 68, if desired. The disk is again rinsed 72 before Ni-P deposition 73, rinsed again 74 and dried 74 before polishing and cleaning 75. The disk is texturized and cleaned 76 for the spin coating application. The disk is then spin coated 77 with iron oxide particulate media in the preferred embodiment, and cured 78 before buffing 79. The disk is then ready for lubrication 80 and testing 81 before final assembly into the disk drive storage devise it will ultimately be used for.

Finally, reference should be made to FIG. 1 in which the final results of the old particulate process 11, the particulate process which is the subject of this patent 10, and the thin film process 12 which has been compared to ot are illustrated. The relative sizes of the layers are shown by measurement and not relative size and the layers are labeled with numerals followed with letters a,b, and c, for lube, media and undercoat, respectively. Layer d is the aluminum substrate.

What is claimed is:

1. Apparatus comprising:
   a substrate:
   a first layer electrolessly plated onto said substrate comprising nickel and phosphorous, and
   a second layer of particulate magnetic media spin-coated onto said first layer; said particulate magnetic media comprising magnetic particles suspended in a binder.

2. Apparatus according to claim 1 wherein said layer of nickel and phosphorous comprises a layer between 150 to 250 microinches thick.

3. Apparatus according to claim 2 wherein said layer of nickel and phosphorous comprises a polished surface.

4. Apparatus according to claim 1 wherein saod particulate magnetic layer comprises a layer approximately twenty (20) microinches thick.

* * * * *